US010327526B2

(12) United States Patent
Knittel et al.

(10) Patent No.: US 10,327,526 B2
(45) Date of Patent: Jun. 25, 2019

(54) CARRYING DEVICES WITH BUILT-IN SECURITY SYSTEM

(71) Applicants: Marta Knittel, Los Angeles, CA (US); Shoshana Joseph, Los Angeles, CA (US)

(72) Inventors: Marta Knittel, Los Angeles, CA (US); Shoshana Joseph, Los Angeles, CA (US)

( * ) Notice: Subject to any disclaimer, the term of this patent is extended or adjusted under 35 U.S.C. 154(b) by 0 days.

(21) Appl. No.: 15/898,210

(22) Filed: Feb. 15, 2018

(65) Prior Publication Data

US 2018/0255894 A1 Sep. 13, 2018

Related U.S. Application Data

(60) Provisional application No. 62/459,950, filed on Feb. 16, 2017.

(51) Int. Cl.
*A45C 13/18* (2006.01)
*G08B 13/196* (2006.01)
(Continued)

(52) U.S. Cl.
CPC ................ *A45C 13/18* (2013.01); *A45C 3/02* (2013.01); *A45C 3/06* (2013.01); *A45C 5/03* (2013.01);
(Continued)

(58) Field of Classification Search
CPC .... A45C 3/02; A45C 3/04; A45C 3/06; A45C 5/03; A45C 5/032; A45C 5/035; A45C 5/037; A45C 13/18; A45C 13/22; G08B 13/18; G08B 13/181; G08B 13/19; G08B 13/191; G08B 13/194; G08B 13/196
See application file for complete search history.

(56) References Cited

U.S. PATENT DOCUMENTS 8,964,037 B2 2/2015 Petricoin, Jr.
9,224,096 B2 * 12/2015 Oppenheimer ......... G06F 21/50
(Continued)

FOREIGN PATENT DOCUMENTS

GB 567397 A 2/1945

OTHER PUBLICATIONS

Article "Case with built-in cameras reveals the Journey of Checked Baggage", http://petapixel.com/2011/12/28/case-with-built-in-cameras-shwos-what . . . .
(Continued)

*Primary Examiner* — Van T Trieu
(74) *Attorney, Agent, or Firm* — Dara L. Onofrio, Esq.; Onofrio Law

(57) ABSTRACT

A carrying device with a built-in security system including a security unit (10) having components housed in an integral unit, where the components include a camera (1) with a light sensor (2); a speed sensor (4); a distance sensor (9); a GPS tracker (8); a transponder (7) for sending and accepting digital data; a microcontroller (15), and a rechargeable power supply (5) in electrical communication with the microcontroller (15), the camera (1), the speed sensor (4), the distance sensor (9), the GPS tracker (8), and the transponder (7), to monitor the location and contents of the carrying device and to provide real time feedback to the user.

20 Claims, 5 Drawing Sheets

13 6 12 3 16 2 4 5 1 11 13 13 7 15 8 9 10 13

(51) Int. Cl.

| | |
|---|---|
| ***A45C 5/03*** | (2006.01) |
| ***A45C 3/06*** | (2006.01) |
| ***A45C 3/02*** | (2006.01) |
| ***A45C 13/24*** | (2006.01) |
| ***G08B 25/08*** | (2006.01) |
| ***G01S 19/48*** | (2010.01) |
| *A45F 3/04* | (2006.01) |
| *H02J 7/00* | (2006.01) |
| *H02J 7/35* | (2006.01) |
| *A63B 102/32* | (2015.01) |
| *A63B 55/00* | (2015.01) |
| *G08B 25/10* | (2006.01) |

(52) U.S. Cl.

CPC .............. *A45C 13/24* (2013.01); *G01S 19/48* (2013.01); *G08B 13/19695* (2013.01); *G08B 25/08* (2013.01); *A45F 3/04* (2013.01); *A63B 55/00* (2013.01); *A63B 2102/32* (2015.10); *A63B 2220/12* (2013.01); *A63B 2220/30* (2013.01); *A63B 2220/806* (2013.01); *A63B 2225/54* (2013.01); *A63B 2225/72* (2013.01); *G08B 25/10* (2013.01); *H02J 7/0052* (2013.01); *H02J 7/35* (2013.01); *H02J 7/355* (2013.01); *H02J 2007/0062* (2013.01)

(56) References Cited

U.S. PATENT DOCUMENTS

| | | | | |
|---|---|---|---|---|
| 9,380,258 | B2 | 6/2016 | Sandy | |
| 9,643,722 | B1 * | 5/2017 | Myslinski | B64C 39/024 |
| 9,786,145 | B2 * | 10/2017 | Oppenheimer | G06F 21/50 |
| 2009/0315704 | A1 | 12/2009 | Rosing et al. | |
| 2010/0325060 | A1 | 12/2010 | McIntosh | |
| 2011/0265714 | A1 | 10/2011 | Fourcade et al. | |
| 2014/0089243 | A1 * | 3/2014 | Oppenheimer | G06F 21/50<br>706/46 |
| 2015/0029026 | A1 | 1/2015 | Brandes et al. | |
| 2015/0136552 | A1 | 5/2015 | Mercado | |
| 2015/0337565 | A1 | 11/2015 | DiBella et al. | |
| 2016/0255928 | A1 * | 9/2016 | O'Donnell | A45C 5/03 |
| 2017/0188679 | A1 * | 7/2017 | Jacob | H04W 76/10 |

OTHER PUBLICATIONS

Andersen, "attendre Le Suitcase, "Ubiquity (vol. 2002, Issue April). Retrieved on Apr. 11, 2018 from the internet at URL:<https://ubiquity.acm.org/article.cfm?id=512571> Entire document.

* cited by examiner

CARRYING DEVICES WITH BUILT-IN SECURITY SYSTEM

This application claims the benefit of U.S. provisional application Ser. No. 62/459,950 filed Feb. 16, 2017 which is incorporated herein in its entirety by reference.

FIELD OF THE INVENTION

The present invention relates in general to carrying devices with at least one built-in embedded security unit for monitoring the contents therein. More particularly, the invention relates to carrying devices with a security system for real time and security monitoring of belongings therein.

BACKGROUND OF THE INVENTION

Everyone wonders what happens to their luggage when their bags are checked at the airport. Due to security regulations, the Transportation Security Administration ("TSA") must be able to open and inspect your luggage, which most times is not done in your presence and items can be misplaced or stolen. It is also possible that baggage handlers can go through your luggage too and steal your valuables or mistreat your suitcase by throwing it across the room. Even if you had a lock on your carry bag a thief can easily break the locks.

Another big problem when traveling is missing luggage. It is an inconvenient event to have arrived at a new travel destination and your suitcase to be lost in transit.

U.S. Publication No. 2015/0136552 to Mercado discloses a luggage tracking and surveillance system device having a replaceable zipper pull and interior retaining fastening member. The replaceable zipper pull has a touch sensor, power system, GPS and system for communicating with the retaining fastener. The fastening member contains a camera, GPS, touch sensor, power system and system for communicating with the zipper pull.

U.S. Pat. No. 8,964,037 to Petricoin Jr. discloses a battery-powered camera mounted within the interior of a suitcase. The security system includes a switch center, camera, controller for storing data, motion detector, touch sensor, motion sensor and a weight sensor at various places inside the surface of the suitcase.

U.S. Patent Publication No. 2015/0337565 to DiBella et al. is a security device which can be added to the luggage.

It is known in the prior art that there are luggage pieces with cameras, but most of these cameras are removable and don't allow the user to view their luggage and contents at all times and keep constant watch over them.

The invention solves these problems by providing carrying devices with a built-in security system. The system includes a security unit having all components housed in an integral unit embedded in the carrying device. The components include a camera with a light sensor, a speed sensor, a distance sensor, a GPS tracker, a microcontroller, a transponder and a rechargeable power supply to provide real time images to a user of the status of their carrying device and the contents therein.

The purpose of invention device is to protect people's belongings from theft and keep their belongings safe. Users of the carrying devices, which include carry bags such as luggage, handbags, backpacks, briefcases, golf bags and the like, with the built-in security system, can view the cameras at any time from any personal digital assistant or computer to view footage to see who has opened their luggage or other carrying device and taken their belongings.

A purpose of the invention is that it will be a deterrent to theft and make a thief think twice before opening your bag.

Another purpose of the invention is for baggage handlers to handle your bags with more caution knowing they are being viewed.

Another purpose of the invention is to track your bag and/or contents to monitor if any items are stolen.

Yet another purpose of the invention is to provide the user with a monitoring system and alarm system to alert the user when their carry bag is open and to permit them to see the individual who opened the carry bag.

Another purpose is to provide a musical instrument case with a built-in security unit both inside and outside the case to monitor the location and status of the instrument stored inside.

Another purpose of the invention is to provide a backpack with a built-in security unit both inside and outside the backpack to monitor the location and status of the backpack and contents therein.

Yet another purpose of the invention is to provide a backpack with a built-in security unit both inside and outside the backpack, where the outer security unit aids in bully prevention since it provides the user with images from behind when the backpack is on their back.

Another purpose of the invention is to provide a briefcase with a built-in security unit both inside and outside the briefcase to monitor the location and status of the briefcase and contents therein.

Another purpose of the invention is to provide a golf bag with a built-in security unit both inside and outside the briefcase to monitor the location and status of the golf bag and contents therein.

SUMMARY OF THE INVENTION

In the present invention, these purposes, as well as others which will be apparent, are achieved generally by a carrying device comprised of at least one built in non-removable embedded security unit for monitoring the contents of the carrying device.

Each security unit includes a camera, rechargeable power supply, light, speed and distance sensors, a microcontroller and a speaker/receiver. At least one security unit is built-in and embedded in the outer surface of the carry bag and at least one security unit is built-in and embedded in the inner surface of the carry bag. This allows the user to have access to views both inside and outside the carry bag.

The built-in security unit has a transponder for sending and accepting digital data to a central processor and storage of digital data outside of the unit.

The invention device uses WiFi and/or Bluetooth connections to communicate with a remote control and/or a personal digital assistant (PDA) such as a mobile phone. The remote control allows the user to turn sensors, cameras, alarms and messages on or off. The PDA device can also be used to turn sensors, cameras, alarms and messages on or off.

The user can use a PDA to access a web-based platform which permits the user to track the carrying device and monitor the contents therein. The system detects, by light sensors, when the carrying device is opened, and by distance sensors, when the device is moved away an undesired distance from the user and is programed to send an alarm to the owner of the carrying device.

Other objects, features and advantages of the present invention will be apparent when the detailed description of the preferred embodiments of the invention are considered with reference to the drawings, which should be construed in an illustrative and not limiting sense.

DETAILED DESCRIPTION OF THE INVENTION

The invention describes a carrying device with a built-in security unit. The security unit enables the user to monitor the status, location and contents of their carrying device. The components of the invention device are defined as indicated with the referenced numerals as follows and shown in the accompanying figures:

1—camera;
2—light sensor on the camera;
3—shatter proof/bullet proof glass cover the camera lens;
4—speed sensor;
5—rechargeable power supply;
6—USB charging port;
7—transponder;
8—GPS tracker;
9—distance sensor;
10—Security unit;
11—Secure digital memory card;
12—Speaker/receiver;
13—Hard plastic outer surface of the security unit;
14—solar panel;
15—micro-controller;
16—camera lens;
17—remote control;
18—personal digital assistant (PDA);
19—central processor (remote);
20—outer surface of the carry bag'
25—internal cavity of the carry bag; and
30—inner surface of the carry bag.

Figure 1:
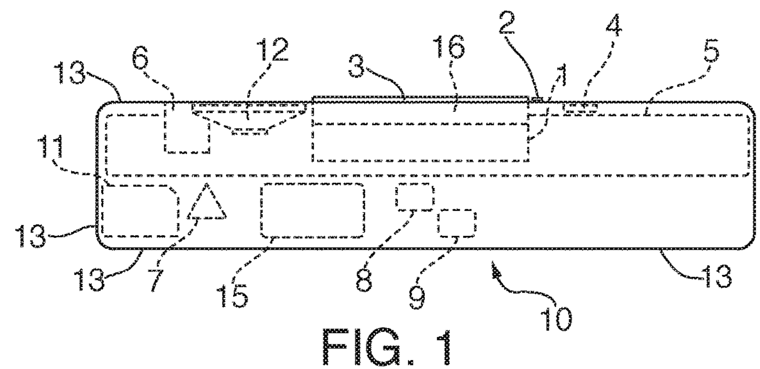
FIG. 1 illustrates the embedded camera according to the invention.

As illustrated in FIG. 1, the security unit 10 has the following components a camera 1 with a light sensor 2; a speed sensor 4; a distance sensor 9; a GPS tracker 8; a transponder 7 for sending and accepting digital data; and a rechargeable power supply 5 in electrical communication with the microcontroller 15, camera 1, the speed sensor 4, the distance sensor 9, the GPS tracker 8 and the transponder 7.

The main component of the security unit of the invention is the camera 1 with a light sensor 2. Generally, when the carry bag is in an open position the light sensor senses the change in light and is triggered to turn on the camera 1 in the security unit 10. When the carry bag is closed it's dark inside and the light sensor is triggered to switch the camera off. The embodiment with the light sensor is used in both situations where the security unit is embedded on the inner surface and outer surface of the carry device.

The camera itself is non-removable from the security unit embedded in the carry bag. The camera is preferably the size of a dime or less, similar in size to the cameras used in mobile devices. The power supply is essentially the same size. The camera may be hidden or in plain view. Typically, the camera in the outer units are in view to discourage potential thieves while the inner units are hidden or less visible. The lens 16 of the camera 1 is covered by a shatter proof bullet proof glass 3. The lens 16 is also water proof and anti-fogging. The lens 16 can also be an infrared eye lens and a night vision lens.

The camera itself has a panoramic 360 degree view and is similar to the cameras that are built in at the rear of a motor vehicle used to view the surroundings when backing up. Due to the wide view of the camera itself there is no need for the user to have to control the angle or reposition the camera. The only control over the camera is to turn it on or off for capturing photos or streaming video. Any number of spy/wireless cameras currently on the market can be used in the invention as long as they are built in and non-removable. The make and size of the camera depend on the carrying device and can vary. Cameras that can be used in to the security unit include the Lentenda Mini Remote SPY Camera for Iphone Android Ipad Pc MiniWifi Ip Wireless Spy Surveillance Camera Remote Cam.

As seen in FIG. 1 all components of the security unit 10 are housed within an integral unit having a shatter and bullet proof glass 3 covering over the camera lens 16 and a hard plastic outer surface 13. The hard plastic case built is built around the security unit for protection and is embedded in the carry bag. Preferably the hard plastic case is slim, less than ½ inch and the entire security unit approximately 4 inches by 3 inches.

The sensors used in the invention include light sensors, speed sensors, distance sensors and in the suitcase embodiment an altitude sensor. While these are the preferred sensors used in the invention, other sensors or devices achieving the same function can be used. In general, sensors are a type of transducer, however, the main difference is that a transducer is a device that can convert energy from one form to another, whereas a sensor is a device that can detect a physical quantity and convert the data into an electrical signal.

In general, a light sensor is an electronic device used to detect light. Several types of light sensors are known and can be used in the invention. A photocell or photo resistor is a small sensor which changes its resistance when light shines on it. A CCD (charged coupled device) transports electrically charged signals and is usually found in digital cameras and night-vision devices. Photomultipliers detect light and multiply it.

Motion detector sensors are known to be used in advanced security systems and include passive infrared (PIR) motion detectors. These sensors "see" the infrared energy emitted by an intruder's body heat. When an intruder walks into the field of view of the detector, the sensor detects a sharp increase in infrared energy. These sensors can be incorporated into the security unit.

In the embodiment where the carry bag is luggage or a suitcase and the security unit further includes an altitude sensor. Altitude is typically determined based on the measurement of atmospheric pressure. The greater the altitude, the lower the pressure. A barometer and gyroscope are used for air pressure measurements. The altitude sensor is preferably preprogramed so that once the carry bag reaches an altitude height of 5,000 feet the camera is turned off. The camera can then be programmed to turn on and off at certain altitudes. When stored in flight, no one will be opening bags above 10,000 feet and if the camera is off the power supply battery life will be saved.

The speed sensor 4 is preprogramed so that once the carry bag hits speeds of 150 miles per hour the camera is turned off. The security unit can include a accelerometer to determine speed.

The distance sensor 9 is preprogramed to track the carry bag a desired distance and is used in combination with the GPS tracker 8 for monitoring the location of the carry bag. When the chosen distance is achieved an alert is sent to the user via text message or as a ping on a personal digital assistant device.

The distance sensor can be an ultrasonic sensor which measures the distance to an object by using sound waves. It measures distance by sending out a sound wave at a specific frequency and listening for that sound wave to bounce back. By recording the elapsed time between the sound wave being generated and the sound wave bouncing back, it is possible to calculate the distance between the sonar sensor and the object. The Ultrasonic Sensor sends out a high-frequency sound pulse and then times how long it takes for the echo of the sound to reflect back. The sensor has 2 openings on its front. One opening transmits ultrasonic waves, (like a tiny speaker), the other receives them, (like a tiny microphone).

Laser sensors are used where small objects or precise positions are to be detected. They are designed as through-beam sensors, retro-reflective sensors or diffuse reflection sensors. Laser light consists of light waves of the same wave length with a fixed phase ratio (coherence).

The invention also includes Global Positioning System (GPS) Sensors. GPS sensors are receivers with antennas that use a satellite-based navigation system with a network of multiple satellites in orbit around the earth to provide position, velocity, and timing information. The orbits are arranged so that at any time, anywhere on Earth, there are at least four satellites "visible" in the sky. A GPS receiver locates four or more of these satellites, figure out the distance to each, and use this information to deduce its own location. Generally, GPS itself does not require an internet connection but it does if used in smartphones because it needs access to geographic map data.

The transponder 7 sends and accepts digital data collected from the security unit. The transponder 7 sends digital data to a remote central processor 19 wherein a user can access the central processor 19 via a personal digital assistance device 18 to view the digital data transmitted. A transponder is a wireless communications, monitoring, or control device that picks up and automatically responds to an incoming signal. The term is a contraction of the words transmitter and responder. Transponders can be either passive or active.

The rechargeable power supply 5 can be selected from a variety of sources including rechargeable batteries, such as lithium or NiCd, or solar powered.

The power supply is in electrical communication with the camera 1, the speed sensor 4, the distance sensor 9, the GPS tracker 8 and the transponder 7 either by a wired connection or a wireless connection.

The security unit further consists of a charging port 6 for the rechargeable power supply.

In an alternate embodiment a solar panel 14 is located on the outer surface 20 of the carry bag and is in electrical communication with the rechargeable power supply 5.

The invention includes a remote control for the security unit which is in communication with the transponder 7. Communication is by Wi-Fi or Bluetooth depending on the distance and whether the device used has been paired with the security unit.

Figure 1A:
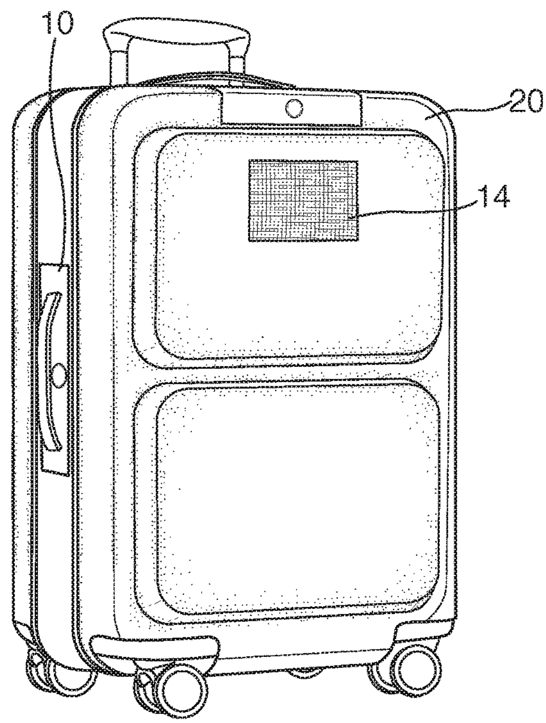
FIG. 1A is an illustration of the carrying device in a closed position and the outside view of the embedded security unit according to the invention.

The carrying device according to the invention includes a carry bag having an open and closed position. FIG. 1A shows the carry bag as a suitcase/luggage in a closed position having an outer surface 20. The security unit 10 of the invention is built in and embedded on this outer surface 20. The security unit is flush on the outer surface 20 and is preferably visible to the naked eye to act as a deterrent to potential thieves. The security unit 10 may be anywhere on the outer surface 20 put is preferably located at the top of the carrying device near the handle.

In an alternate embodiment, a solar panel 14 is on the outer surface for recharging the power supply 5.

Figure 1B:
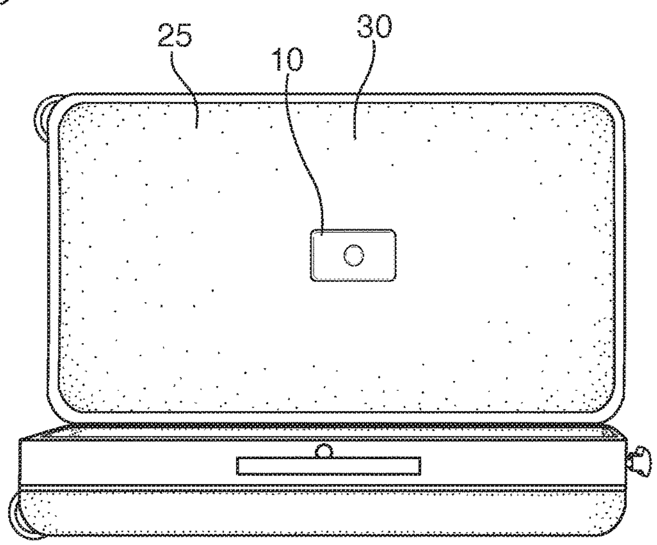
FIG. 1B is an illustration of the carrying device in an open position and the inside view of the embedded security unit according to the invention.

FIG. 1B shows the carry bag in an open position. An internal cavity 25 is shown having an inner surface 30. The security unit 10 of the invention is built in and embedded on this inner surface 30. Up to five security units 10 can be built-in and embedded in the inner surface 30 of the luggage or suitcase.

In all embodiments of the invention at least one security unit 10 is built-in and embedded in the outer surface 20 of the carry bag and at least one security unit 10 is built-in and embedded in the inner surface 30 of the carry bag.

A microprocessor generally does not have RAM, ROM and IO pins. It usually uses its pins as a bus to interface to peripherals such as RAM, ROM, Serial ports, Digital and Analog IO. It is expandable at the board level due to this. A microcontroller is 'all in one', the processor, ram, IO all on the one chip, as such you cannot (say) increase the amount of RAM available or the number of IO ports. The controlling bus is internal and not available to the board designer. In general, this means that a microprocessor is generally capable of being built into bigger general purpose applications than a microcontroller. The microcontroller is usually used for more dedicated applications such as used in the present invention. However, in some applications a microprocessor can be used.

The microcontroller of the invention has the following properties: typically 8 to 32 bit; runs at speeds less than 200 MHz; uses very little power; provides current to operate an LED; is a useful interface with sensors and motors; constrained for RAM and flash storage.

The security unit of the carrying device further includes a secure digital (SD) memory card 11. The secure digital memory card 11 preferably has a capacity between 4 GB and 32 GB. The SD card is generally the size of a dime and can be preprogrammed to take a series of photos when the camera is activated. The user will have options to choose the number of photos taken or continuous photos or video until the movement stops and the camera is shut off.

A speaker/receiver 12 is present on the security unit. This speaker can be used to sound an alarm to prevent a potential thief from stealing contents or the carry bag itself. The owner of the carry bag can also send prerecorded sounds to the carry bag such as "Drop it now" or "I can see you" to again prevent the potential thief from stealing the carry bag or the contents therein. When the carry bag is on a plane this feature would be disabled for safety reasons.

In alternate embodiments, multiple security units can be incorporated particularly where ever the device can be opened. For example, as seen in FIG. 1A, if the luggage piece has dual openings, one camera can be built on the side and one camera on the front. At least two cameras are preferably since the luggage can be opened in these two places. In the luggage embodiment it is possible to have up to five cameras can be built in to the interior surface of the carry bag for maximum viewing. Positions of the security unit would be one in the front, one in the back, one on each side and one on the inside middle.

Figure 2A:
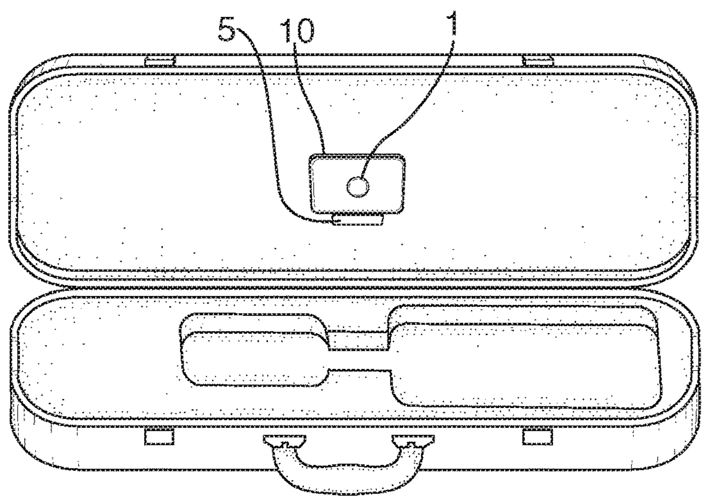
FIG. 2A is an illustration of the embodiment of the invention where the carrying device with a built-in security system is a musical instrument case in an open position.
Figure 2B:
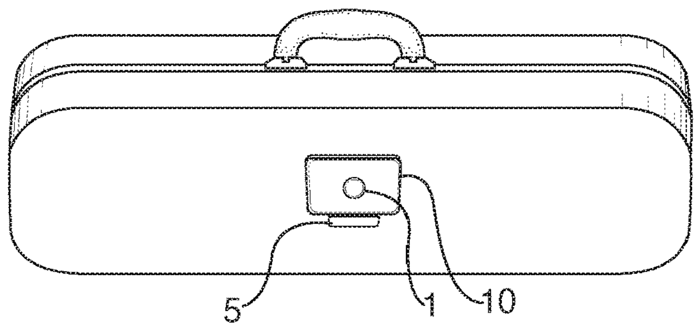
FIG. 2B is this embodiment in a closed position.

FIG. 2A is an illustration of the embodiment of the invention where the carrying device with a built-in security system is a musical instrument case in an open position. The security unit 10 is positioned in the middle of the case. The camera 1 of the unit is visible. FIG. 2B is this embodiment in a closed position illustrating a security unit 10 on the outer surface with the camera 1 visible to the naked eye. The owner of the case can program the system in such a way that if the case is opened screeching music can stream from the speaker loud enough to be heard over 20 feet away.

Figure 3:
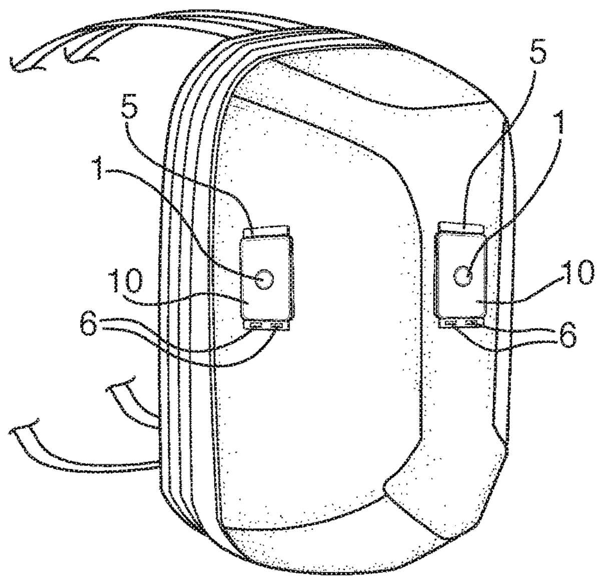
FIG. 3 is an illustration of the embodiment of the invention where the carrying device with a built-in security system is a backpack.

FIG. 3 is an illustration of the embodiment of the invention where the carrying device with a built-in security system is a backpack. The backpack itself can have a solid back and made of bullet proof material. As shown multiple security units 10 are built in all over the backpack on the backside and on the sides. The camera 5 and recharging USB ports 6 for the power supply are shown. Not illustrated but included in this embodiment is a security unit 10 on the interior surface.

Where the carry bag is a backpack the security unit also can be used in bully prevention. A school aged teenage can monitor their digital device to watch the cameras in the security unit to see if someone is approaching from behind. It's as if they have eyes in the back of their head.

Figure 4A:
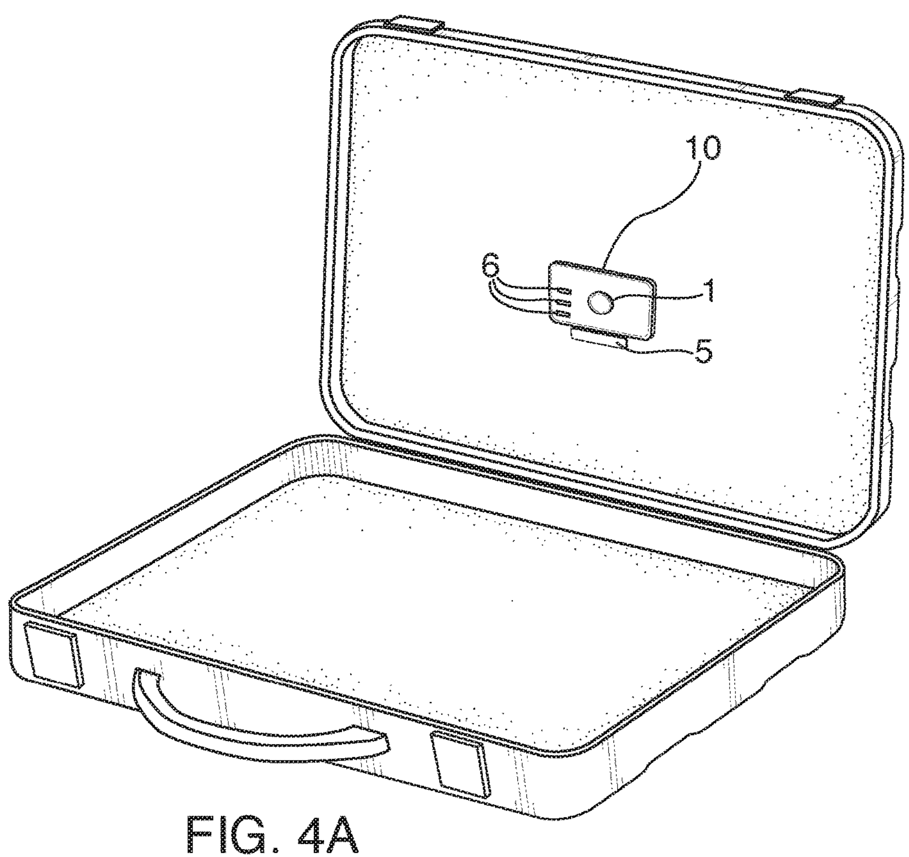
FIG. 4A is an illustration of the embodiment of the invention where the carrying device with a built-in security system is a briefcase in an open position.
Figure 4B:
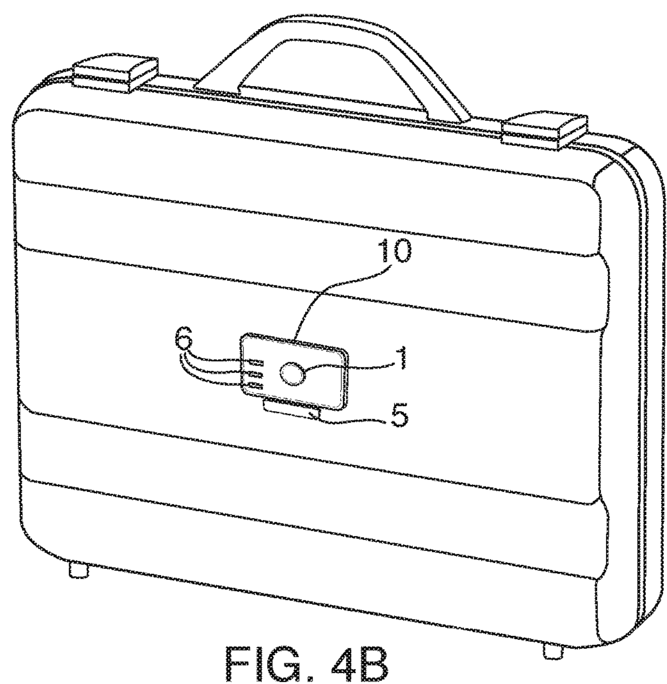
FIG. 4B is this embodiment in a closed position.

FIG. 4A is an illustration of the embodiment of the invention where the carrying device with a built-in security system is a briefcase in an open position. The security unit 10 is positioned in the middle of the case. The camera 1 of the unit is visible. FIG. 4B is this embodiment in a closed position illustrating a security unit 10 on the outer surface with the camera 1 visible to the naked eye. The camera 5 and recharging USB ports 6 for the power supply are shown.

In embodiments where the carry bag is a handbag or purse, the security units would be built in on the outer and inners surfaces as described in the other embodiments.

Figure 5:
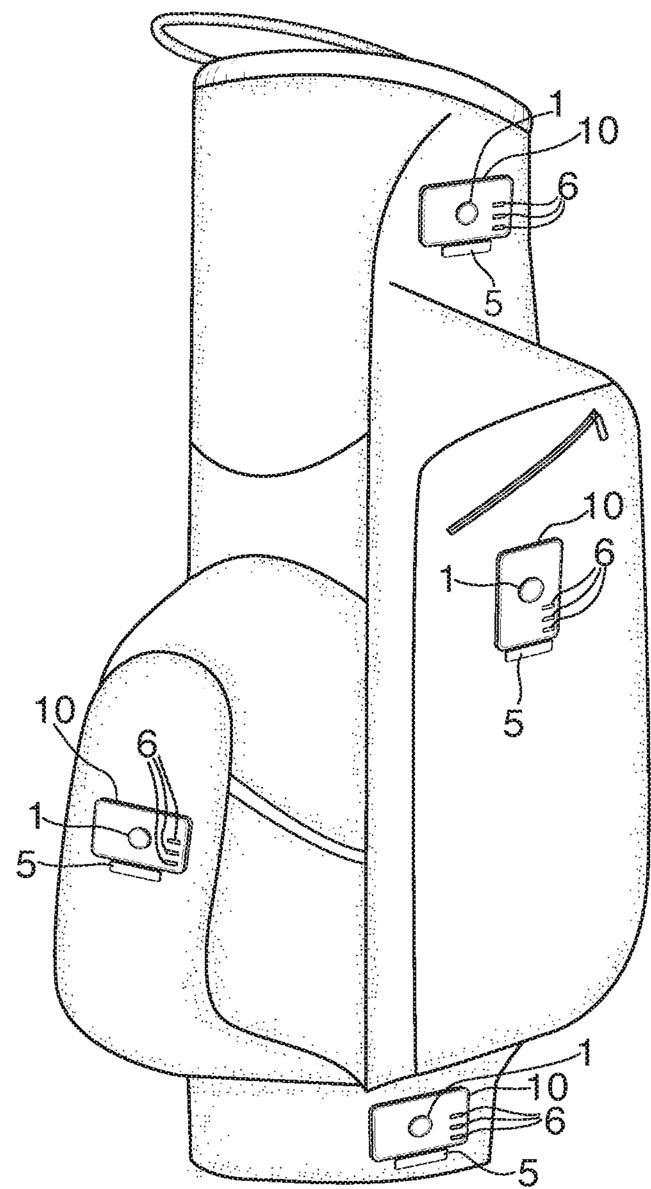
FIG. 5 is an illustration of the embodiment of the invention where the carrying device with a built-in security system is a golf bag.

FIG. 5 is an illustration of the embodiment of the invention where the carrying device with a built-in security system is a golf bag. One or multiple security units can be built into the golf bag. As shown in FIG. 5 there is a security unit 10 at the top of the golf bag, one on the front pouch, one on the side pouch and one on the bottom of the bag. Each unit provides the user with a different perspective view. It enables the owner to not only monitor the golf bag and contents when they step away from the bag to use the restroom or even on the golf course itself.

Once the suitcase is opened the light triggers the light sensor on the camera to activate the camera to start taking photos/video. Using the remote control device the user can automatically turn on the cameras, either all of them or just a select number. The cameras could also be already activated by the respective sensors. The cameras in the security unit can be set manually or be set to be activated by the light sensor.

The camera on the outside of the carry bag can be on all the time depending on the user's needs.

The invention includes a remote control 17 that can turn on and off the security unit components as desired. For example, where the carry bag is luggage or a suitcase, the user can set the security unit to automatically turn off when the plane accelerates or is at a certain altitude or when the GPS tracker shows it's stored under the plane.

There is a choice to not turn on those sensors. This is important for carry-on luggage since many items are stolen from overhead compartments, especially when the owner can't keep the carry on near them.

Figure 6:
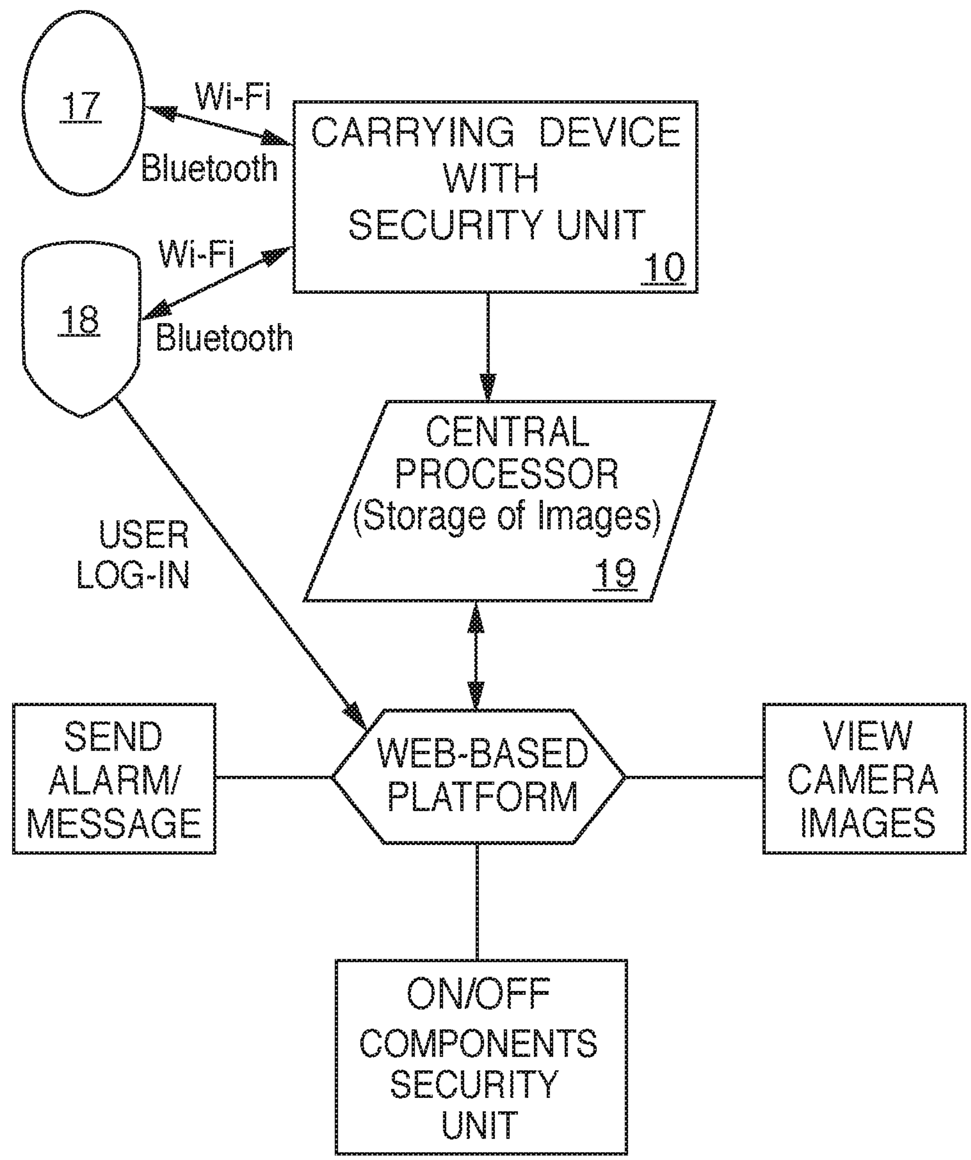
FIG. 6 is a schematic illustration of the security monitoring system according to the invention.

The security system of the invention is illustrated in the schematic of FIG. 6. The remote control 17 can be paired by Bluetooth to the security unit 10 of the carrying device or if too far away can be connected via Wi Fi. The remote control can be used to turn the cameras, sensors and alarms on and off as desired by the user.

Wi-Fi, originally meant "wireless fidelity," is primarily about connecting one or many devices to the Internet or creating a local wireless network that can link multiple devices. It depends on a central base station (or multiple stations) that sends out a network signal strong enough and wide enough to cover, say, an office or home, a coffee shop or even an airport. It sends out what might be thought of as invisible Internet "rays" around the globe that can be tapped into by any laptops, smartphones or tablets within their range to get online. Bluetooth is much shorter-range, usually around 10 to 30 feet. It rarely involves getting onto the Internet and doesn't depend on any central device like a router. It is almost always used to connect two devices together in some useful way.

Like mobile phones, a W-Fi network makes use of radio waves to transmit information across a network. The computer or PDA includes a wireless adapter that translates data sent into a radio signal. This same signal will be transmitted, via an antenna, to a decoder known as the router.

As mentioned earlier digital output from the security unit 10 is sent to a remote central processor 19 for storage of the images. These images are accessed by the owner by a web-based platform. The invention cameras are in communication with the web platform wherein the user can monitor the handling and opening of the carrying device in real time or the stored images. The invention has both Bluetooth and WI-Fi capability to feed activity from the camera for viewing at all times via a web-based platform.

A PDA 18 or any device that can access the internet can be used to access the camera feeds from the security unit 10, using the web-based platform. There is a user login for viewing the feed from the cameras.

Once a user has logged into the platform a number of functions can be performed by the user. The platform enables the user to view each camera feed from the security units in the carry bag. It also enables the user to be able to turn the security unit components on or off, similar to the remote control functions. For example, the user can selectively turn on or off a camera or sensor as desired in any of the security units 10 of the carry bag.

The platform also enables the user to send out an alarm or message to the speaker/receiver 12 on the carry device itself. The user can send an alarm or a pre-recorded voice message or command.

This platform allows users of the carrying devices according to the invention to be able to view their bag at all times if they choose.

Users are able to review and record footage up to a certain amount of time. Unless instructed otherwise, the cameras in the security units are constantly recording and are able to hold up to a certain amount of footage, typically up to 4 days. After 4 days, it automatically purges the saved footage unless the footage has been backed up to another device. However, the user can go back and view footage and then record whatever footage they choose and save it.

The user also gets an alert on their digital device if their carrying device is being opened. The user can also set an alarm to go off if the carry device is opened if so desired. In all embodiments of the invention allows the user to track their carrying device.

The following examples indicate how the invention device can be used:

Example 1

A person is driving to Atlantic City and leaves their luggage in the car. The car is locked but the person knows someone can break into the car, but they don't feel like carrying a 49 lb. luggage inside to the bathroom. They activate the invention security unit to start the cameras recording and initiate the GPS tracking. They also activate the distance sensor to "PING ME IF MY LUGGAGE MOVES MORE THAN 10 FEET." The user can choose 10 feet, 100 feet, 1,000 feet as desired.

If the thief steals the luggage, but doesn't open it, the user still gets the alert/ping that my luggage is moving when it's supposed to be locked in my trunk. Not only do they know it's being stolen, but it is video recording where the thief is going. And then when the thief opens the luggage, he's being video recorded. This digital data is all being sent to a central processor for access by the user in real time if desired. A voice alert or an alarm can be sent to the carrying device broadcasting through the speaker 12 "Why are you opening my luggage?" or "This is being reported to the police".

While the invention has been described with examples of preferred embodiments the invention includes other variations. Such as the security unit of the invention can be built in and incorporating inside and outside of a motor vehicle, boat, or even a pet carrying case.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A carrying device with a built-in security system comprising:

a carry bag having an open and closed position and an outer surface (20) and an internal cavity (25); wherein said internal cavity has an inner surface (30);

a security unit (10) comprising components consisting of:

a camera (1) with a light sensor (2);

a speed motion sensor (4);

a distance motion sensor (9);

a GPS tracker (8);

a microcontroller (15);

a transponder (7) for sending and accepting digital data; and a rechargeable power supply (5); in electrical communication with said microcontroller (15), camera (1) said speed sensor (4), said distance sensor (9), said GPS tracker (8) and said transponder (7);

wherein said components are housed entirely within a single integral unit having a shatter and bullet proof glass covering (3) over the camera lens (16) and a hard plastic outer surface (13) over the rest of said unit; and wherein at least one said security unit (10) is built-in and embedded in said outer surface (20) of the carry bag and/or at least one said security unit (10) is built-in and embedded in said inner surface (30) of the carry bag.

2. The carrying device according to claim 1; wherein said security unit further consists of a secure digital memory card (11).

3. The carrying device according to claim 2, wherein said secure digital memory card (11) has a capacity between 4 GB and 32 GB.

4. The carrying device according to claim 1, wherein said security unit further consists of a charging port (6) for said rechargeable power supply.

5. The carrying device according to claim 1, further comprising a solar panel (14) on said outer surface (20) of the carry bag in electrical communication with said rechargeable power supply (5).

6. The carrying device according to claim 1, further comprising a speaker/receiver (12).

7. The carrying device according to claim 1, wherein said carry bag is luggage or a suitcase and said security unit further comprises an altitude motion sensor.

8. The carrying device according to claim 7, wherein up to five said security units (10) are built-in and embedded in said inner surface (30) of said luggage or suitcase.

9. The carrying device according to claim 7, wherein said altitude motion sensor is preprogramed so that once the carry bag reaches an altitude height of 5,000 feet said camera is turned off.

10. The carrying device according to claim 1, wherein said carry bag is selected from the group consisting of handbags, briefcases, backpacks, golf bags and musical instrument cases.

11. The carrying device according to claim 1, wherein said transponder (7) sends digital data to a remote central processor (19) wherein a user can access said central processor (19) via a personal digital assistance device (18) to view said digital data transmitted.

12. The carrying device according to claim 1, wherein when the carry bag is in an open position said light sensor (2) is triggered to turn on said camera (1).

13. The carrying device according to claim 1, wherein said distance sensor (9) is preprogramed to track the carry bag a desired distance.

14. The carrying device according to claim 13, wherein when said chosen distance is achieved an alert is sent to the user.

15. The carrying device according to claim 1, wherein said speed motion sensor (4) is preprogramed so that once the carry bag hits speeds of 150 miles per hour said camera (1) is turned off.

16. The carrying device according to claim 1, further comprising a remote control (17) in communication with said security unit.

17. The carrying device according to claim 16, wherein said remote control (17) can turn on and off said security unit components.

18. A security unit (10) for use in a carrying device, comprising components housed entirely within a single integral unit having a hard outer surface (13) with a portion of said surface having a shatter and bullet proof glass covering (3), wherein said components consist essentially of:

a camera (1) with a lens (16) and light sensor (2), wherein said glass covering (3) is over said camera (1);

a speed motion sensor (4);

a distance motion sensor (9);

a digital memory card (11);

a microcontroller (15);

a transponder (7) for sending and accepting digital data;

a rechargeable power supply (5) in electrical communication with said microcontroller (15), camera (1), said speed sensor (4), said distance sensor (9), said GPS tracker (8) and said transponder (7); and a charging port (6) for said rechargeable power supply.

19. The security unit (10) according to claim 18, further comprising a speaker/receiver (12).

20. The security unit (10) according to claim 18, further comprising an altitude motion sensor.

* * * * *